Patented Dec. 13, 1927.

1,652,378

UNITED STATES PATENT OFFICE.

AUGUSTIN SEGUIN, OF PARIS, FRANCE.

APPARATUS FOR MEASURING SPEEDS.

Application filed August 15, 1922, Serial No. 582,085, and in France August 19, 1921.

The present invention has for its object modifications in the drive of the indicating pointer in the apparatus constructed according to my prior U. S. Patent No. 1,424,384, in which the speed is indicated by the meeting point of an element which rotates always in a forward direction and at a speed which is constantly proportional to the one which is to be measured, with an element of comparison having an alternating motion and whose speed during its backward stroke is independent of the speed to be measured.

In my prior Patent No. 1,424,384, the indicating pointer is driven directly either by the element of constantly forward rotation, and in the direction of the increasing speeds, only when the speed to be measured increases, or by the element of comparison in the opposite direction and only when the speed to be measured decreases.

According to this invention the indicating pointer is driven in both directions, with a predetermined lost motion or play, by an intermediate member adapted to be driven directly backward, i. e., in the direction of the decreasing speeds, by the element of comparison, and to be driven forward through a constant angle at each revolution of the element of constantly forward rotation, by a contact member connected with the latter.

Figure 1:
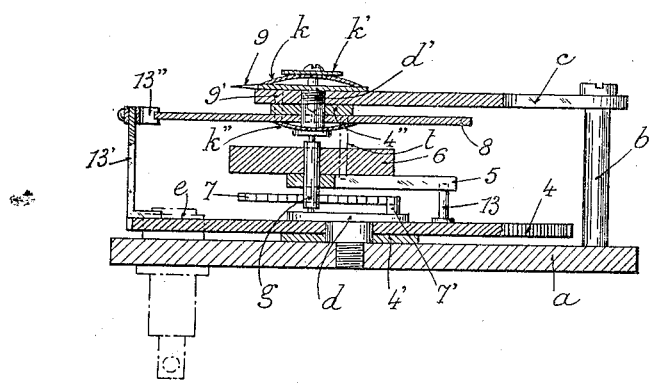

In the accompanying drawing illustrating by way of example an embodiment of the apparatus according to the invention, Fig. 1 shows the apparatus partly in section and partly in side view.

Figure 2:
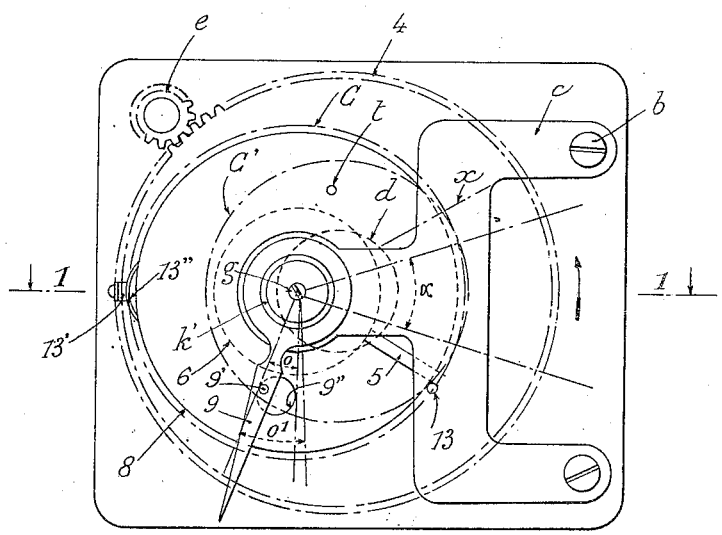

Fig. 2 is a plan view of the same.

As shown in the drawing the apparatus comprises the plate $a$, a bridge piece which is constituted by the two distance rods $b$ and the plate $c$.

The axle pin $g$ carries a balance wheel 6 provided with a spiral spring 7 one end whereof is secured at 7' to the screw $d$; said axle pin is pivoted on the one hand to the screw $d$ but is eccentered with respect to the axis of said screw, and on the other hand to the screw $d'$ secured to the bridge piece $c$. The wheel 4, rotating on a bearing plate 4', is operated by the pinion $e$ and in the direction of the arrow (Fig. 2), at a speed proportional to that which is to be measured, and the spring 7 tends to drive the balance wheel 6 in the opposite direction. This wheel 4 carries a fixed stud 13 which may come into contact with a striker 5 mounted on the balance wheel. Due to the eccentricity of the circular path C of the striker 5 with reference to the circular path C' of the inner edge of the stud 13, this contact is impossible in a determined angle $\alpha$ of this rotation. The drawing shows the apparatus in the position in which the stud 13 is ready to release the striker 5, i. e., a position near one of the intersecting points of the circles C and C'. When the stud 13 rotating forward according to the arrow (Fig. 2) encounters the striker 5 driven backward by the balance wheel, the striker and the balance wheel are stopped and then are driven forward by the stud 13, until the latter slightly passes the position illustrated; the stud 13 still rotating forward, then releases the striker and thus the balance wheel, which starts backward with the striker until the latter is again encountered by the stud 13. The position for which the stud releases the striker is constant and well determined by the distance between the axes of pin $g$ and screw $d$, and by the length of the striker.

A screw $d'$ eccentered with respect to the screw $d$, maintains by friction by means of the convex steel disc $k''$, a disc against a bearing plate 4'' and the bridge piece $c$. The disc 8 constitutes the intermediate member and carries a finger $t$ which can be engaged with the striker 5.

The wheel 4 carries a support 13' opposite the stud 13; the upper end of said support is provided with a small spring strip 13'' which, due to the eccentricity between the disc 8 and the wheel 4 will contact with the edge of said disc through a certain angle $o$ at each revolution of the wheel 4, and will press upon said edge of the disc with a strength sufficient to drive the latter. The disc 8 is thus rotated forward (direction of the arrow) through the angle $o$ at each revolution of the wheel 4.

The indicating pointer 9 is pivoted on the bridge $c$ by friction by means of a convex steel disc $k$ held by a small bridge-piece $k'$, and carries a stud 9' which enters a hold 9'' in the disc 8, said hole subtending an angle of opening which is at least equal to $o$. When the disc 8 is rotated the stud 9' abuts against the edge of the hole 9'', on one side or the other, and the pointer 9 is thus actuated forward or backward.

The apparatus being at rest, the pointer indicating the speed O, if the wheel 4 is operated the speed of the latter being first slow, the disc 8 is driven forward through the angle $o$ as above described; the striker 5 driven forward by the stud 13, is then released from the latter and driven backward by the spring 7 through the balance wheel 6. During this backward stroke of the striker the latter encounters the finger $t$ and drives it back together with the disc 8, until the stud 13 again meets the striker and drives it forward. But the speed of wheel 4 increasing, at the next revolution of said wheel the stud 13 meets the striker, rotating backward, before the point at which said meeting was previously effected and consequently during this second revolution, the finger $t$ is not driven backward by the striker as far as during the first revolution. It will thus be seen that since the disc 8 is rotated successively forward through a constant angle $o$, and backward through a decreasing angle, and this during the successive revolutions of the wheel 4, the mean position of the disc is moved gradually forward. When the speed at which the wheel 4 is rotated has reached its normal value which is to be measured, i. e. remains constant, the disc 8 at each revolution of the wheel 4 will be impelled forward through the constant angle $o$ by the spring 13″ and on the other hand impelled through the same angle in the opposite direction by the striker 5 until this striker makes contact with the stud 13 at a fixed point for the speed now constant. Thus, the disc 8 will swing through a constant angle $o$ starting from a position depending on the speed to be measured. If the speed to be measured decreases, the striker 5 will drive the disc 8 backward through a greater angle that when said speed is constant and until said striker comes again into engagement with the stud 13. The disc 8 thus reaches a new position of swing $o$ depending on the new speed. If the speed increases, the spring 13″ at each revolution of the wheel 4 will impel the disc 8 forward through the constant angle $o$ but the striker will drive the disc 8 backward through a smaller angle that when the speed is constant, and the disc 8 takes a new position of swing $o$ depending on the new speed.

The indicating pointer 9 being connected with the disc 8 through the intermediary of a play $o$, this pointer will take a fixed position for each position of swing $o$ of the disc 8 and hence for each value of the speed to be measured. Should this play be $o'$, greater than $o$ i. e. if the angle subtended by the hole 9″ is greater than $o$, a dead angle $o'-o$, is thus provided, which determines the variation of speed necessary to obtain a change of position of the indicating pointer 9, which will afford the desired aperiodicity for the pointer.

It should be noted that when driving engagement ceases between elements 13 and 5, the striker 5 may move back under the action of spring 7 until spring 7 is entirely unwound. This might occur in two cases:

(1) The stud 13 moves very slowly so that, when the striker 5 has made a backward complete revolution, the stud 13 is still within the angle $\alpha$.

(2) The stud 13 moves at a considerable speed, so that, when the stud 13 has made a forward complete revolution, the end of the striker 5 is still within the angle $\alpha$.

In order to prevent such unwinding of the spring 7, the eccentricity of the two paths C and C″ and the length of the striker 5 may be so determined that the angle $\alpha$ is very small. In this manner, the device is operative, within a large range of speeds and is only inoperative for very slow speeds or very high speeds. In practice, this is not a drawback since all measuring apparatus are constructed for normally working within determined limits of speeds.

It should be noted that the spiral spring need not be wound through more than one complete revolution in order to properly operate. In other words, the apparatus will be so designed and calibrated that the speed will be correctly indicated when the idle position of the balance wheel substantially corresponds to the position of the axis of the striker shown at $x$ in Fig. 2, the spiral spring 7 being then entirely unwound. If, for slow speeds, beneath the lower limit of speed corresponding to the capacity of the apparatus, the stud 13 fails to meet the striker 5, during the travel in the sector of angle $\alpha$ due to the balance wheel being urged back by its spring and by inertia beyond the position $x$, the indication will be wrong and will remain so until the speed to be measured will have sufficiently increased to fall within the range of speeds which may be measured with the apparatus.

I claim:

1. An apparatus for measuring speeds comprising a driving member, means for constantly imparting to said driving member a motion in a forward direction and at a speed proportional to that to be measured, a balance wheel eccentered with respect to said driving member and adapted to be driven forward by the latter and to be released therefrom by way of said eccentricity, a spiral spring urging said balance wheel backward, an intermediate member adapted to be rotated forward through a constant angle at each revolution of the driving member and to be rotated backward by said balance wheel and indicating means operatively connected with said intermediate member with a predetermined play whereby the desired aperiodicity of the pointer is ensured.

2. An apparatus for measuring speeds comprising a driving member, means for constantly imparting to said driving member a motion in a forward direction and at a speed proportional to that to be measured, a balance wheel eccentered with respect to said driving member and adapted to be driven forward by the latter and to be released therefrom by way of said eccentricity, a spiral spring urging said balance wheel backward, a circular disc coaxial with said balance wheel and adapted to be driven backward by the same, a coupling member carried by said driving member and adapted to drive said disc forward through a constant angle at each revolution of the driving member and indicating means operatively connected with said disc with a predetermined play whereby the desired aperiodicity of the pointer is ensured.

3. An apparatus for measuring speeds comprising a driving member, means for constantly imparting to said driving member a motion in a forward direction and at a speed proportional to that to be measured, a balance wheel eccentered with respect to said driving member, a striker mounted on said balance wheel, a spiral spring urging said balance wheel backward, a stud carried by said driving member and adapted to contact with said striker for driving the same forward within a determined angle, a circular disc coaxial with said balance wheel, a pin carried by said disc and adapted to be encountered by said striker during the backward rotation of the latter, a coupling member carried by said driving member and adapted to drive said disc forward through a constant angle at each revolution of the driving member and indicating means operatively connected with said disc with a predetermined play whereby the desired aperiodicity of the pointer is ensured.

4. An apparatus for measuring speeds comprising a driving member, means for constantly imparting to said driving member a motion in a forward direction and at a speed proportional to that to be measured, a balance wheel eccentered with respect to said driving member and adapted to be driven forward by the latter and to be released therefrom by way of said eccentricity, a spiral spring urging said balance wheel backward, a circular disc coaxial with said balance wheel and adapted to be driven backward by the same, a spring blade carried by said driving member and adapted to contact with the edge of said disc through a constant angle at each revolution of the driving member and indicating means operatively connected with said disc with a predetermined play whereby the desired aperiodicity of the pointer is ensured.

5. An apparatus for measuring speeds comprising a driving member, means for constantly imparting to said driving member a motion in a forward direction and at a speed proportional to that to be measured, a balance wheel eccentered with respect to said driving member and adapted to be driven forward by the latter and to be released therefrom by way of said eccentricity, a spiral spring urging said balance wheel backward, a circular disc coaxial with said balance wheel and adapted to be driven backward by the same, a coupling member carried by said driving member and adapted to drive said disc forward through a constant angle at each revolution of the driving member, an opening in said disc having a predetermined diameter, a pointer and a stud carried by said pointer, and extending through said opening whereby the desired aperiodicity of the pointer is ensured when said opening in the disc is moved relatively to said stud.

In testimony whereof I have signed my name to this specification.

AUGUSTIN SEGUIN.